(12) United States Patent
Slachta et al.

(10) Patent No.: US 11,263,281 B2
(45) Date of Patent: Mar. 1, 2022

(54) DYNAMIC WEB SITE DISPLAY CUSTOMIZATION BASED ON LOCAL WEATHER EVENTS

(71) Applicant: International Business Machines Corporation, Armonk, NY (US)

(72) Inventors: Kyle Slachta, Medfield, MA (US); Keshine O'Young, Andover, MA (US); Amy Travis, Arlington, MA (US); Xinyue Liu, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 16/237,974

(22) Filed: Jan. 2, 2019

(65) Prior Publication Data
US 2020/0210508 A1     Jul. 2, 2020

(51) Int. Cl.
*G06F 16/9537* (2019.01)
*G06F 16/958* (2019.01)
*G06F 16/9538* (2019.01)

(52) U.S. Cl.
CPC ........ *G06F 16/9537* (2019.01); *G06F 16/958* (2019.01); *G06F 16/9538* (2019.01)

(58) Field of Classification Search
CPC . G06F 16/9537; G06F 16/958; G06F 16/9538
See application file for complete search history.

(56) References Cited

U.S. PATENT DOCUMENTS

| | | | |
|---|---|---|---|
| 7,383,130 B1 | 6/2008 | Koosam | |
| 7,421,344 B1* | 9/2008 | Marsh | G01W 1/02 702/3 |
| 7,849,082 B2 | 12/2010 | Westphal | |
| 8,234,575 B2 | 7/2012 | Hartin et al. | |
| 9,113,342 B1* | 8/2015 | Kotab | H04W 24/00 |
| 9,754,274 B1 | 9/2017 | Brussin et al. | |
| 2002/0138331 A1* | 9/2002 | Hosea | G06F 16/9577 705/7.37 |
| 2011/0022465 A1* | 1/2011 | Malleshaiah | G06Q 30/02 705/14.54 |
| 2012/0072825 A1* | 3/2012 | Sherkin | G06F 16/345 715/234 |
| 2013/0104026 A1* | 4/2013 | Reynar | G06F 16/29 715/234 |
| 2014/0089417 A1* | 3/2014 | Van Os | H04L 51/00 709/206 |

(Continued)

*Primary Examiner* — Tamara T Kyle
*Assistant Examiner* — Lahcen Ennaji
(74) *Attorney, Agent, or Firm* — Yee & Associates, P.C.

(57) ABSTRACT

A method and system for dynamically customizing website displays is provided. Upon receiving a request from a user to display a web page, the geographic locations of items described on the web page is determined as well as the geographic location of the user. A relevance of the locations on the web page to the user is determined according to proximity. If the locations are determined to be relevant to the user weather data associated with the locations on the web page and the location of the user is retrieved. Content on the web page related to the weather data is identified, and the standard style sheet for the web page is modified to generate a customized style sheet, wherein weather-related content is displayed more prominently than it would be in the standard style sheet.

17 Claims, 6 Drawing Sheets

(56) References Cited

U.S. PATENT DOCUMENTS

| | | | |
|---|---|---|---|
| 2014/0156749 A1* | 6/2014 | Kanter | G06Q 30/0261 |
| | | | 709/204 |
| 2014/0223448 A1* | 8/2014 | Varoglu | G06F 16/9535 |
| | | | 719/313 |
| 2016/0003637 A1* | 1/2016 | Andersen | G06Q 10/10 |
| | | | 701/519 |
| 2017/0039476 A1* | 2/2017 | Eyring | G06Q 10/1093 |
| 2021/0136537 A1* | 5/2021 | Zaltzman | G06F 3/0485 |

* cited by examiner

DYNAMIC WEB SITE DISPLAY CUSTOMIZATION BASED ON LOCAL WEATHER EVENTS

BACKGROUND

The disclosure relates generally to web site display, and more specifically to a method and system for dynamically customizing a web site display according to real-time weather data related to webpage content.

Internet users are often inundated with information on web sites, and this information is not always presented in a way that allows the users to find the content they need or that they use frequently. In situations in which a weather event is pending, web sites that have relevant information on their pages regarding the weather event might not highlight or emphasize it for users who are affected by it, leaving the information buried in the clutter of other content not related to the weather.

For example, a town might have an official web site that normally displays a notice about parking bans downtown in the event of snow. However, the notice might be displayed inconspicuously along with routine notices.

SUMMARY

A method for dynamically customizing website displays is provided. Upon receiving a request from a user to display a web page, the geographic locations of items described on the web page is determined as well as the geographic location of the user. A relevance of the geographic locations on the web page to the user is determined according to geographic proximity. If the geographic locations are determined to be relevant to the user weather data associated with the locations described on the web page and the location of the user is retrieved. Content on the web page related to the weather data is identified, and the standard style sheet for the web page is modified to generate a customized style sheet wherein weather-related content identified on the web page is displayed more prominently than it would be in the standard style sheet.

A system for dynamically customizing website displays is provided. The system comprises a bus system, a storage device connected to the bus system, wherein the storage device stores program instructions, and a number of processors connected to the bus system, wherein the processors execute the program instructions to: receive a request from a user to display a web page; determine geographic locations of items described on the web page; determine a geographic location of the user; determine a relevance of the geographic locations described on the web page to the user according to geographic proximity; if the geographic locations described on the web page are determined to be relevant to the user, retrieve weather data associated with the locations described on the web page and the location of the user; identify content on the web page related to the weather data; modify a standard style sheet for the web page to generate a customized style sheet, wherein weather-related content identified on the web page is displayed more prominently than it would be in the standard style sheet; and send the web page to the user for display using the customized style sheet.

A computer program product for dynamically customizing website displays is provided that comprises a non-volatile computer readable storage medium having program instructions embodied therewith and the program instructions executable by a computer to cause the computer to perform the steps of: receiving, by a server, a request from a user to display a web page; determining geographic locations of items described on the web page; determining a geographic location of the user; determining a relevance of the geographic locations described on the web page to the user according to geographic proximity; if the geographic locations described on the web page are determined to be relevant to the user, retrieving weather data associated with the locations described on the web page and the location of the user; identifying content on the web page related to the weather data; modifying a standard style sheet for the web page to generate a customized style sheet, wherein weather-related content identified on the web page is displayed more prominently than it would be in the standard style sheet; and sending the web page to the user for display using the customized style sheet.

DETAILED DESCRIPTION

Aspects of the present invention are described herein with reference to diagrams of methods and apparatuses according to embodiments of the invention. The diagrams in the Figures illustrate the architecture and operation of possible implementation methods according to various embodiments of the present invention.

The present disclosure recognizes and takes into account that web sites containing content about specific locations quite often do not specifically emphasize the display of content that is pertinent to special weather conditions. The method and system of the present disclosure monitors upcoming weather events and dynamically updates web pages containing weather-related content viewed by affected users to make that information easier to find.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 1:
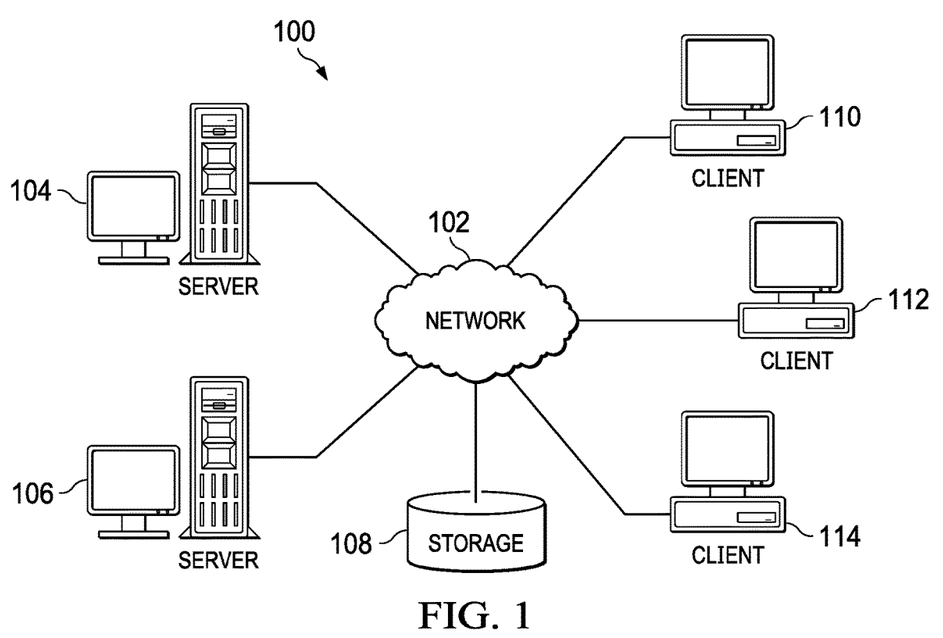
FIG. 1 depicts a pictorial representation of a network of data processing systems in which illustrative embodiments can be implemented.

FIG. 1 depicts a pictorial representation of a network of data processing systems in which illustrative embodiments can be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more connector services for managing idempotent operations on a system of record, such as storage 108. An idempotent operation is an identical operation, which was previously performed or executed, that has the same effect as performing a single operation. Also, it should be noted that server 104 and server 106 may each represent a plurality of servers providing management of idempotent operations for a plurality of system of records.

Client 110, client 112, and client 114 also connect to network 102. Clients 110, 112, and 114 are clients of server 104 and server 106. Server 104 and server 106 may provide information, such as boot files, operating system images, and software applications to clients 110, 112, and 114.

In this example, clients 110, 112, and 114 are shown as desktop or personal computers. However, it should be noted that clients 110, 112, and 114 are intended as examples only. In other words, clients 110, 112, and 114 may include other types of data processing systems, such as, for example, network computers, laptop computers, tablet computers, handheld computers, smart phones, smart watches, personal digital assistants, gaming devices, set-top boxes, kiosks, and the like. Users of clients 110, 112, and 114 may utilize clients 110, 112, and 114 to access system of records corresponding to one or more enterprises, via the connector services provided by server 104 and server 106, to perform different data operations. The operations may be, for example, retrieve data, update data, delete data, store data, and the like, on the system of records.

Storage 108 is a network storage device capable of storing any type of data in a structured format or an unstructured format. In addition, storage 108 may represent a plurality of network storage devices. Further, storage 108 may represent a system of record, which is an authoritative data source, corresponding to an enterprise, organization, institution, agency, or similar entity. Furthermore, storage unit 108 may store other types of data, such as authentication or credential data that may include user names, passwords, and biometric data associated with client users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
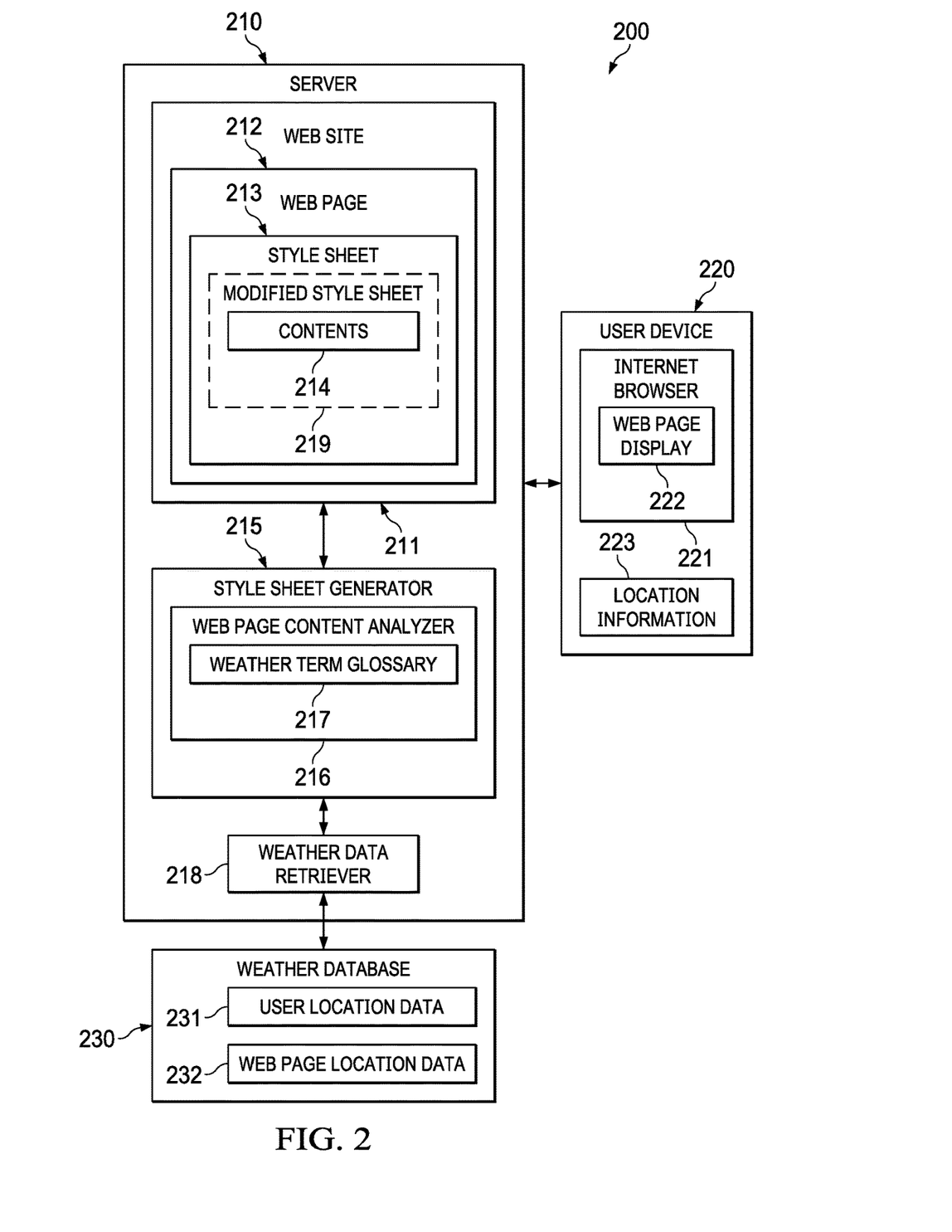
FIG. 2 depicts a dynamic web page display modification system in accordance with illustrative embodiments

FIG. 2 depicts a dynamic web page display modification system in accordance with illustrative embodiments. The system 200 comprises a server 210 that hosts a web site 211, a user device 220 that accesses the web site, and a weather database 230. The server 210 can be an example of servers 104, 106 in FIG. 1. Similarly, user device 220 can be an example of clients' devices 110, 112, 114 in FIG. 1.

The web site 211 can comprise a number of different web pages 212. Each web page 212 has a style sheet 213 that determines how the contents 214 of the web page are displayed. These style sheets 213 are typically created by the web site creator using preexisting templates or from scratch.

The user device 220 comprises an internet browser 221 capable of retrieving a web page 212 from web site 211 and displaying it in web page display 222 according to the style sheet 213 for that page. In requesting the webpage 212 from the server 210, the user device 220 can provide information about its geographic location 223. The location information can be determined according to the device's IP address, GPS data, or similar location finding mechanisms.

In response to a request from the user device 220 to display a web page 212 from the web site 211, a weather data retriever 218 retrieves real-time weather for the user's geographic location 231 as well as for geographic locations 232 described on the webpage 212.

A web page content analyzer 216 searches the web page contents 214 for weather related content. It can use a weather term glossary 217 to aid in this task. If the contents 214 contain information related to the current weather conditions, a style sheet generator 215 can create modified style sheet 219 so that weather related content already present on the web page is displayed more prominently than it is in the standard style sheet 213 for the web page.

Figure 3A:
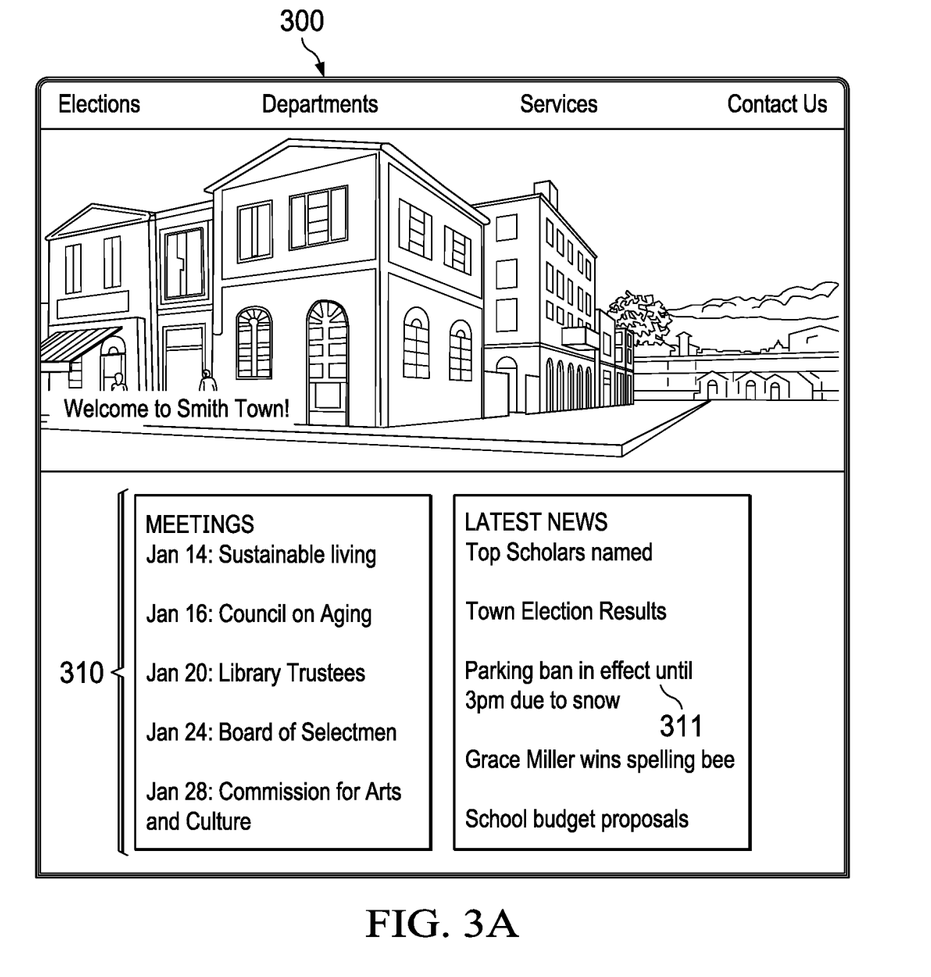
FIGS. 3A and 3B depict an example of a web page containing weather related content that is modified in its manner of display in accordance with illustrative embodiments
Figure 3B:
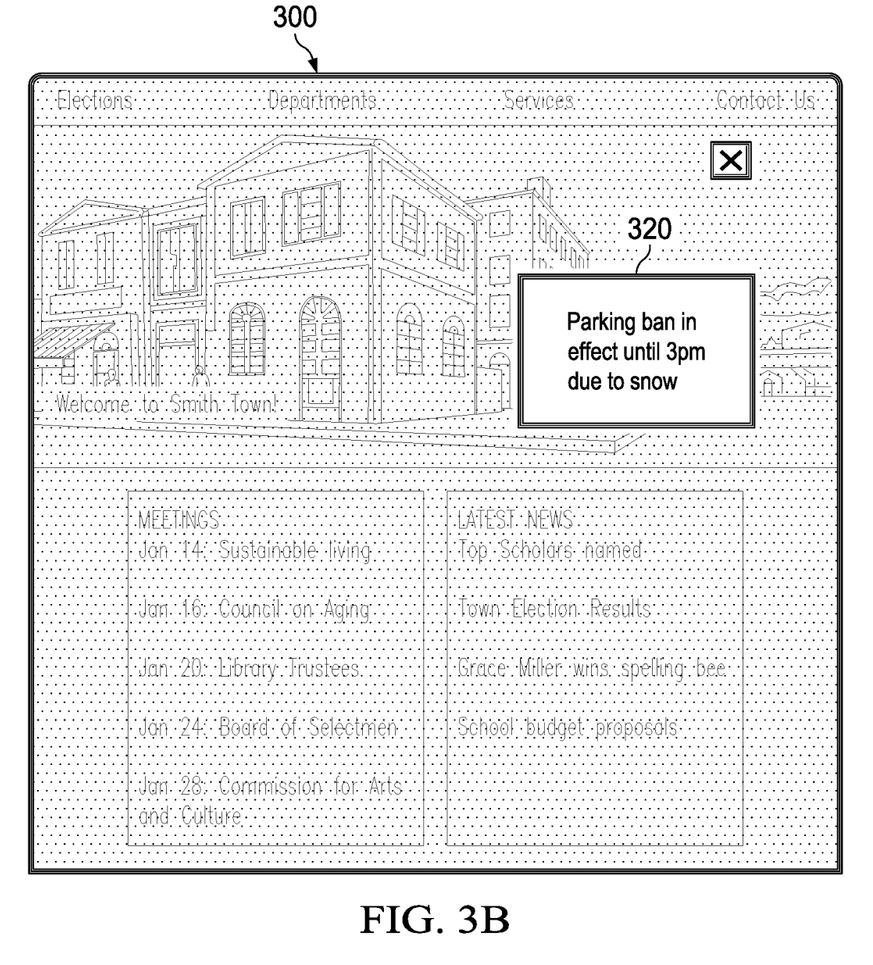

FIGS. 3A and 3B depict an example of a web page containing weather related content that is modified in its manner of display in accordance with illustrative embodiments. In this example a home page 300 for a municipal web site is depicted. The home page 300 includes a number of notices 310. Among these notices is for a parking ban 311 in effect to due snow. However, as can been seen in FIG. 3A, this parking ban notice 311 is displayed inconspicuously among the more routine non-weather-related notices.

As shown in FIG. 3B, by implementing the method of the present disclosure in accordance with illustrative embodiments, the style sheet for web page 300 is modified so that the parking ban notice is displayed prominently in an overlay 320 at the top of the web, while the rest of the web page is displayed more transparently to increase the contrast and draw the viewer's attention to the parking ban notice 320 more easily.

Examples of other types of weather-related content that might be displayed more prominently on a web page include, without limitation, school delays or closings, cancellation of events, change of event location due to rain, rescheduling of an event, and emergency information such as information about local shelters, evacuations, flood warnings, etc.

Figure 4:
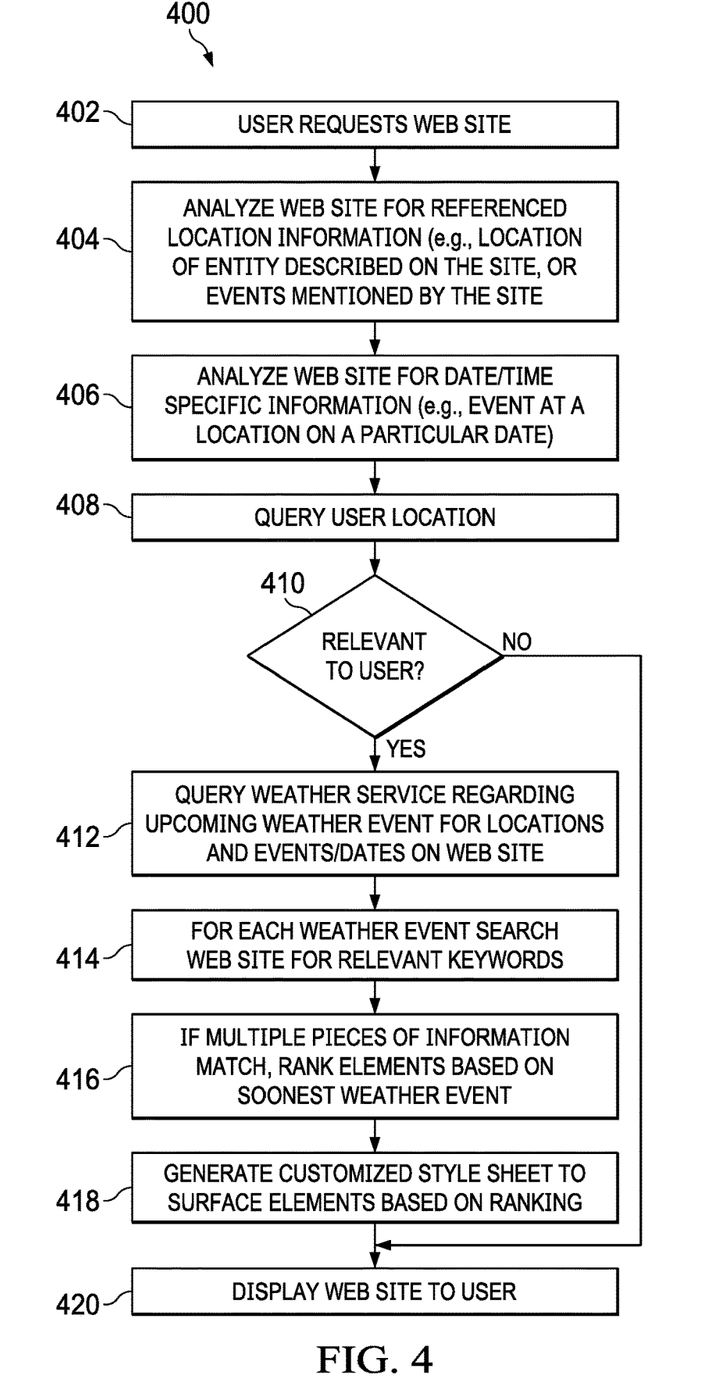
FIG. 4 is a flowchart depicting a process flow for dynamically modifying the display of weather-related content on a web page in accordance with illustrative embodiments.

FIG. 4 is a flowchart depicting a process flow for dynamically modifying the display of weather-related content on a web page in accordance with illustrative embodiments.

Process 400 is initiated when a web site is requested by a user (step 402). In response to the web site request, the web site is analyzed for any geographic location information (step 404). The system identifies geographical locations and/or addresses on the web page from a simple analysis of the content of the web site.

The web site is also queried to find the dates and times of any activities or events associated with the locations referenced on the web site (step 406).

The system then checks for the user's geographical location (step 408). The geographical location can be found, for example, using JavaScript or geo-location capabilities (e.g., GPS, geo-fencing).

The user's location is used to determine if potential weather-relevant events are relevant given the user's distance from locations described on web site (step 410). Relevance can be determined according to the user's proximity to the location(s) described on the web site. For example, if the user is located within 20 miles of a location described on a web site, weather events and related notices such as parking bans, flood warnings, etc., would be highly relevant to the user. In contrast, if the user is located, for example, in Los Angeles and is viewing a municipal web site for a town in the Midwestern United States, pending weather-related occurrences would not be as relevant for that user. Relevance can be determined according to a threshold proximity between the user and locations on the web site.

Relevance can also be determined according to date and time. In an embodiment, the user can grant the system permission to access the user's calendar. By using the calendar, the system can determine relevance for the user not only in terms of the user's location vis-à-vis the locations described on the web site but also if and when the user might be scheduled to visit the locations during the dates/timeframe determined in step 406. Furthermore, calendar information might reveal relevance that would not be apparent from location information alone. Referring back to the example above of the user located in Los Angeles, the user might be visiting a web site about a conference to be held in Chicago, and a blizzard is predicted to postpone the conference. The blizzard and postponement might not seem relevant to the user based on location information alone. However, if the user's calendar has an entry that the user is scheduled to attend that conference, the weather event and its consequences are now relevant to the user.

If the location information on the web site is not relevant to the user, the system proceeds to display the web site on the user display (step 420).

If the location information on the web site is relevant to the user, the system then retrieves real-time and predicted weather data for the user's location and any locations and events described on the web site, including dates and time, using a weather application protocol interface (API) (step 412).

For each weather event retrieved from the weather API, the system searches the web site for weather-related keywords and phrases (step 414). Examples of such keywords and phrases might include, without limitation, parking ban, cancelled, postponed, rescheduled, delayed, closing, relocation, etc. As mentioned above, the system can cross-reference a glossary of weather-related terms and phrases. It might also rely on metadata and other indicators to find weather-related content on the web site. The system can inspect the web site for document object model (DOM) elements that underlie objects on each web page and identifying DOM elements underlying weather-related content.

If the system finds multiple pieces of weather-related information on the web site, the system compares weather events local to both the user and locations described on the web site and ranks website elements based on the soonest weather event (step 416).

After the weather-related elements on the web page are identified and ranked, the system generates a customized style sheet for the page to rearrange the presentation of the web page to the user for optimal use (step 418). The customized style sheet can be generated using Cascaded Style Sheets to highlight elements most relevant to the user. Various approaches can be taken to customize the style sheet. For example, elements related to severe weather (e.g., tornado, hurricane, flood, snow, etc.) can appear larger than other elements on the page. Weather-related information can be moved to the top of the web page. As shown in FIGS. 3A and 3B, weather-related occurrences can also be displayed in special overlays, and/or non-weather-related content on the page be altered to display more transparently, thereby increasing visual contrast for easier visual location by the user. Once the customized style is generated, it is then appended to the web site to display the weather-related content more prominently. In illustrative embodiments, the modified web page display also includes a user selection device (e.g., an X close button on an overlay such as in FIG. 3B) to allow the user to revert back to the standard style sheet after noting the weather-related content.

After the customized style sheet is generated, the web site is displayed to the user (step 420).

Figure 5:
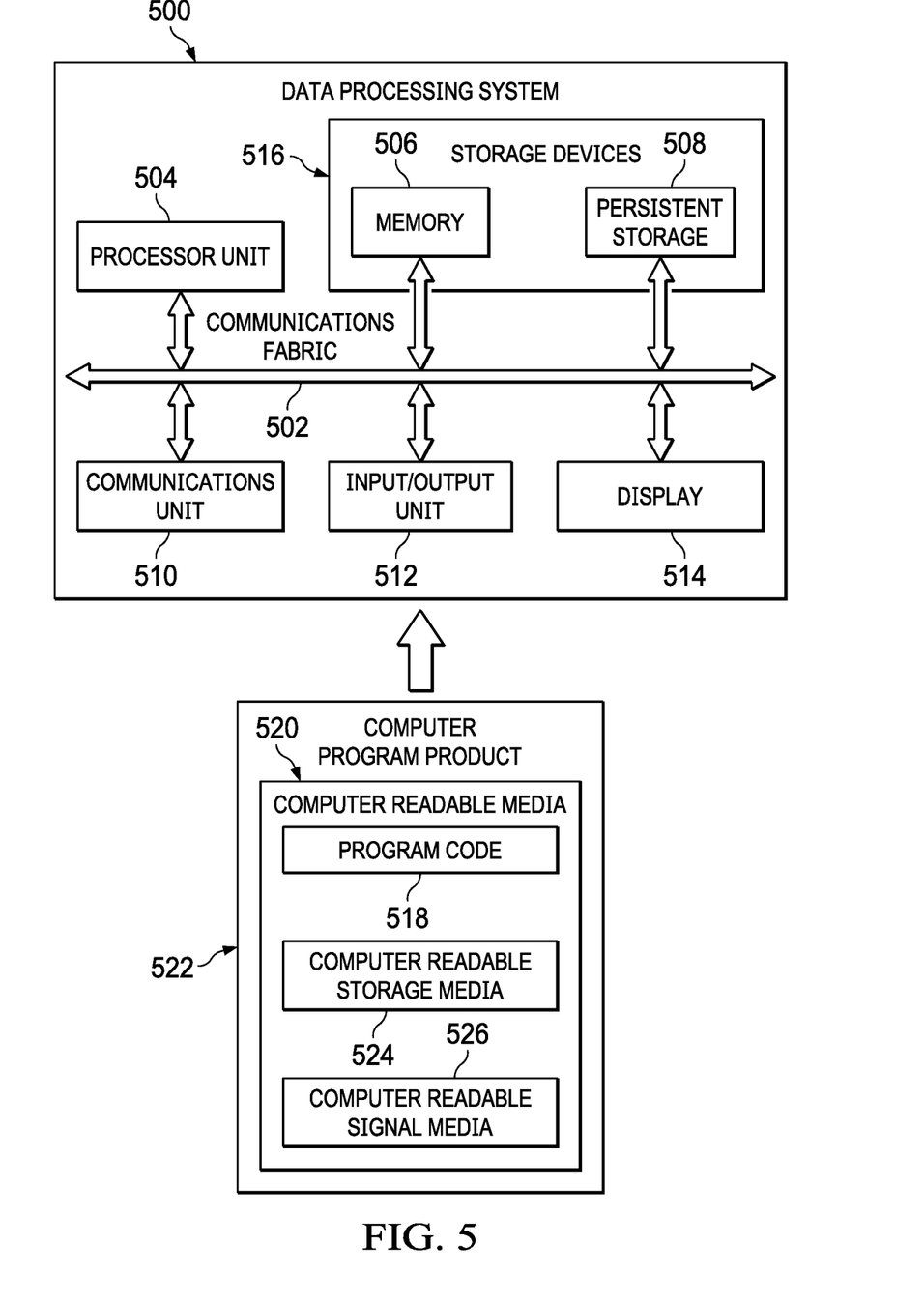
FIG. 5 is a diagram of a data processing system is depicted in accordance with an illustrative embodiment.

Turning to FIG. 5, a diagram of a data processing system is depicted in accordance with an illustrative embodiment. Data processing system 500 is an example of a system in which computer-readable program code or program instructions implementing processes of illustrative embodiments may be run. In this illustrative example, data processing system 500 includes communications fabric 502, which provides communications between processor unit 504, memory 506, persistent storage 508, communications unit 510, input/output unit 512, and display 514.

Processor unit 504 serves to execute instructions for software applications and programs that may be loaded into memory 506. Processor unit 504 may be a set of one or more hardware processor devices or may be a multi-processor core, depending on the particular implementation. Further, processor unit 504 may be implemented using one or more heterogeneous processor systems, in which a main processor is present with secondary processors on a single chip. As another illustrative example, processor unit 504 may be a symmetric multi-processor system containing multiple processors of the same type.

A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 506, in these examples, may be, for example, a random-access memory, or any other suitable volatile or non-volatile storage device. Persistent storage 508 may take various forms, depending on the particular implementation. For example, persistent storage 508 may contain one or more devices. For example, persistent storage 508 may be a hard drive, a flash memory, a rewritable optical disk, a rewritable magnetic tape, or some combination of the above. The media used by persistent storage 508 may be removable. For example, a removable hard drive may be used for persistent storage 508.

Communications unit 510, in this example, provides for communication with other computers, data processing systems, and devices via network communications unit 510 may provide communications using both physical and wireless communications links. The physical communications link may utilize, for example, a wire, cable, universal serial bus, or any other physical technology to establish a physical communications link for data processing system 500. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 500.

Input/output unit 512 allows for the input and output of data with other devices that may be connected to data processing system 500. For example, input/output unit 512 may provide a connection for user input through a keypad, keyboard, and/or some other suitable input device. Display 514 provides a mechanism to display information to a user and may include touch screen capabilities to allow the user to make on-screen selections through user interfaces or input data, for example.

Instructions for the operating system, applications, and/or programs may be located in storage devices 516, which are in communication with processor unit 504 through communications fabric 502. In this illustrative example, the instructions are in a functional form on persistent storage 508. These instructions may be loaded into memory 506 for running by processor unit 504. The processes of the different embodiments may be performed by processor unit 504 using computer-implemented program instructions, which may be located in a memory, such as memory 506. These program instructions are referred to as program code, computer-usable program code, or computer-readable program code that may be read and run by a processor in processor unit 504. The program code, in the different embodiments, may be embodied on different physical computer-readable storage devices, such as memory 506 or persistent storage 508.

Program code 518 is located in a functional form on computer-readable media 520 that is selectively removable and may be loaded onto or transferred to data processing system 500 for running by processor unit 504. Program code 518 and computer-readable media 520 form computer program product 522. In one example, computer-readable media 520 may be computer-readable storage media 524 or computer-readable signal media 526. Computer-readable storage media 524 may include, for example, an optical or magnetic disc that is inserted or placed into a drive or other device that is part of persistent storage 508 for transfer onto a storage device, such as a hard drive, that is part of persistent storage 508. Computer-readable storage media 524 also may take the form of a persistent storage, such as a hard drive, a thumb drive, or a flash memory that is connected to data processing system 500. In some instances, computer-readable storage media 524 may not be removable from data processing system 500.

Alternatively, program code 518 may be transferred to data processing system 500 using computer-readable signal media 526. Computer-readable signal media 526 may be, for example, a propagated data signal containing program code 518. For example, computer-readable signal media 526 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 518 may be downloaded over a network to persistent storage 508 from another device or data processing system through computer-readable signal media 526 for use within data processing system 500. For instance, program code stored in a computer-readable storage media in a data processing system may be downloaded over a network from the data processing system to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system including components in addition to, or in place of, those illustrated for data processing system 500. Other components shown in FIG. 5 can be varied from the illustrative examples shown. The different embodiments may be implemented using any hardware device or system capable of executing program code. As one example, data processing system 500 may include organic components integrated with inorganic components and/or may be comprised entirely of organic components excluding a human being. For example, a storage device may be comprised of an organic semiconductor.

As another example, a computer-readable storage device in data processing system 500 is any hardware apparatus that may store data. Memory 506, persistent storage 508, and computer-readable storage media 524 are examples of physical storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506 or a cache such as found in an interface and memory controller hub that may be present in communications fabric 502.

The present invention may be a system, a method, and/or a computer program product. The computer program product may include a computer-readable storage medium or media having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer readable program instructions to personalize the electronic circuitry, in order to perform aspects of the present invention.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Furthermore, it should be understood that embodiments discussed herein are not limited to the particular features and processing steps shown. The descriptions provided herein are not intended to encompass all of the steps that may be used to form a functional integrated circuit device. Certain steps that are commonly used in fabricating such devices are purposefully not described herein for economy of description.

The flowchart and diagrams in the figures illustrate the method and resulting architecture according to embodiments of the present disclosure. In this regard, each block in the flowchart or structural diagrams may represent a step or partial step, which comprise one or more procedures for implementing the illustrative embodiments. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for dynamically customizing web site displays, the method comprising:
   receiving, by a server, a request from a user to display a web page;
   determining, by a number of processors, geographic locations of items described on the web page;
   determining, by a number of processors, a geographic location of the user;
   determining, by a number of processors, a relevance of the geographic locations described on the web page to the user according to geographic proximity;
   if the geographic locations described on the web page are determined to be relevant to the user, retrieving, by a number of processors, weather data associated with the locations described on the web page and the location of the user;
   identifying, by a number of processors, content on the web page related to the weather data, wherein identifying the content on the web page related to the weather data comprises cross-referencing a glossary of weather-related keywords and phrases;

modifying, by a number of processors, a standard style sheet for the web page to generate a customized style sheet, wherein weather-related content identified on the web page is displayed more prominently than it would be in the standard style sheet; and sending, by the server, the web page to the user for display using the customized style sheet.

2. The method of claim 1, wherein the content identified on the web page comprises notices related to at least one of:
   location;
   event;
   date and time.

3. The method of claim 1, further comprising determining relevance of the geographic location described on the web page to the user according to date and time.

4. The method of claim 1, further comprising:
   querying a web site hosting the web page to determine a data and time of any event associated with the geographic locations described on the web page, wherein the customized style sheet increases the prominence of the weather-related content displayed on the web page by at least one of the following:
   displaying weather-related content in a special overlay;
   displaying weather-related content in a larger format than non-weather-related content; and
   increasing visual transparency of non-weather-related content relative to weather-related content.

5. The method of claim 1, wherein generating the customize style sheet further comprises:
   inspecting the web page for document object model (DOM) elements that underlie objects on the web page;
   identifying DOM elements underlying weather-related content; and
   highlighting the DOM elements identified as relevant to the weather data.

6. The method of claim 5, wherein if multiple elements relevant to the weather data are identified, ranking the elements based on a soonest weather event.

7. A system for dynamically customizing web site displays, comprising:
   a bus system;
   a storage device connected to the bus system, wherein the storage device stores program instructions; and
   a number of processors connected to the bus system, wherein the processors execute the program instructions to:
   receive a request from a user to display a web page;
   determine geographic locations of items described on the web page;
   determine a geographic location of the user;
   determine a relevance of the geographic locations described on the web page to the user according to geographic proximity;
   if the geographic locations described on the web page are determined to be relevant to the user, retrieve weather data associated with the locations described on the web page and the location of the user;
   identify content on the web page related to the weather data, wherein identify the content on the web page related to the weather data comprises cross-referencing a glossary of weather-related keywords and phrases;
   modify a standard style sheet for the web page to generate a customized style sheet, wherein weather-related content identified on the web page is displayed more prominently than it would be in the standard style sheet; and
   send the web page to the user for display using the customized style sheet.

8. The system of claim 7, wherein the content identified on the web page comprises notices related to at least one of:
   location;
   event;
   date and time.

9. The system of claim 7, further comprising determining relevance of the geographic location described on the web page to the user according to date and time.

10. The system of claim 7, further comprising:
    querying a web site hosting the web page to determine a data and time of any event associated with the geographic locations described on the web page, wherein the customized style sheet increases the prominence of the weather-related content displayed on the web page by at least one of the following:
    displaying weather-related content in a special overlay;
    displaying weather-related content in a larger format than non-weather-related content; and
    increasing visual transparency of non-weather-related content relative to weather-related content.

11. The system of claim 7, wherein generating the customize style sheet further comprises:
    inspecting the web page for document object model (DOM) elements that underlie object on the web page;
    identifying DOM elements underlying weather-related content;
    highlighting the DOM elements identified as relevant to the weather data; and
    ranking multiple elements according to the soonest weather event.

12. A computer program product for dynamically customizing web site displays is provided, comprising, the computer program product comprising a non-volatile computer readable storage medium having program instructions embodied therewith, the program instructions executable by a computer to cause the computer to perform the steps of:
    receiving, by a server, a request from a user to display a web page;
    determining geographic locations of items described on the web page;
    determining a geographic location of the user;
    determining a relevance of the geographic locations described on the web page to the user according to geographic proximity;
    if the geographic locations described on the web page are determined to be relevant to the user, retrieving weather data associated with the locations described on the web page and the location of the user;
    identifying content on the web page related to the weather data, wherein identifying the content on the web page related to the weather data comprises cross-referencing a glossary of weather-related keywords and phrases;
    modifying a standard style sheet for the web page to generate a customized style sheet, wherein weather-related content identified on the web page is displayed more prominently than it would be in the standard style sheet; and
    sending the web page to the user for display using the customized style sheet.

13. The computer program product of claim 12, wherein the content identified on the web page comprises notices related to at least one of:

location;
event;
date and time.

14. The computer program product of claim 12, further comprising determining relevance of the geographic location described on the web page to the user according to date and time.

15. The computer program product of claim 12, further comprising:
querying a web site hosting the web page to determine a data and time of any event associated with the geographic locations described on the web page, wherein the customized style sheet increases the prominence of the weather-related content displayed on the web page by at least one of the following:
displaying weather-related content in a special overlay;
displaying weather-related content in a larger format than non-weather-related content; and
increasing visual transparency of non-weather-related content relative to weather-related content.

16. The computer program product of claim 12, wherein generating the customize style sheet further comprises:
inspecting the web page for document object model (DOM) elements that underlie object on the web page;
identifying DOM elements underlying weather-related content; and
highlighting the DOM elements identified as relevant to the weather data.

17. The computer program product of claim 16, wherein if multiple elements relevant to the weather data are identified, ranking the elements based on a soonest weather event.

* * * * *